United States Patent Office 2,886,546
Patented May 12, 1959

2,886,546

STABILIZED LATEX COATING COMPOSITIONS CONTAINING ZINC OXIDE AND ALKALI SALT OF A MONO-OCTYL PHOSPHATE ESTER AND METHOD FOR PRODUCING SAME

Carl L. Dibert, St. Louis, and Dudley A. Taber, Midland, Mich., assignors to The Dow Chemical Company, Midland, Mich., a corporation of Delaware No Drawing. Application February 25, 1957
Serial No. 641,847

9 Claims. (Cl. 260—29.6)

This invention relates to film-forming aqueous dispersions comprising organic polymers and reactive pigments such as zinc oxide. It relates especially to such dispersions that comprise film-forming copolymers of aliphatic conjugated diolefins and monovinylaromatic compounds. It particularly concerns latex coating compositions, such as latex paints, that comprise zinc oxide and a novel stabilizer, and a method of making such compositions.

Film-forming aqueous dispersions comprising organic polymers are well known. Aqueous dispersions of film-forming resinous and/or elastomeric polymers such as copolymers of butadiene and styrene have been employed as, or in the preparation of, coating compositions such as the so-called latex paints. Usually, in the making of latex coating compositions such as latex paints, finely divided solid pigments and fillers are admixed with the aqueous dispersions of film-forming polymers together with suitable dispersing agents and stabilizers. The choice of particular materials is usually limited by the requirement that the resulting composition be a stable dispersion, i.e., one in which the dispersed materials remain well dispersed, and which does not thicken, gel, separate, or coagulate on standing at room temperature in a closed container, at least long enough for the dispersion to be employed as a coating composition.

In many instances, it would be advantageous to employ latex coating compositions containing zinc oxide, e.g. in a latex paint for exterior use. However, many latex paints that have heretofore been compounded with ordinary zinc oxide pigments have not been satisfactory because such paints have not been sufficiently stable. Latex paints, for example, that have been compounded from styrene-butadiene copolymer latexes by admixing therewith solid pigments comprising the usual kind of zinc oxide tend to thicken on standing, i.e., the viscosity increases. Sometimes the dispersion gels, or a portion may separate from the remainder as a layer or as lumps. A complete coagulation of the dispersion sometimes occurs. Such changes in the properties and characteristics of latex-pigment compositions cause difficulties when the compositions are to be applied, and often render the compositions useless.

The difficulties encountered in the preparation of suitable latex coating compositions comprising ordinary zinc oxide pigments have been circumvented in a manner disclosed in U.S. Patent No. 2,727,012 by employing as the zinc oxide pigment material one in which the particles of zinc oxide had been coated with an impervious layer of zinc phosphate and by including in the aqueous dispersion a specific amount of a beta-oxyalkylamine salt of oleic acid as stabilizer. Although latex coating compositions comprising zinc oxide and possessing satisfactory stability can be prepared thereby, the patent indicates that both the special kind of zinc phosphate-coated zinc oxide and the beta-oxyalkylamine oleate were necessary to provide such stability. The teachings of the patent do not supply any means for making stable latex coating compositions from ordinary zinc oxide-containing pigments.

An object of this invention is to provide improved aqueous dispersions comprising film-forming polymers and reactive pigments such as zinc oxide-containing pigments.

A more specific object is to provide means for stabilizing a pigmented aqueous dispersion comprising such reactive zinc oxide-containing pigment and a film-forming polymer aqueous paint latex that tends to coagulate in the presence of such pigment by adding thereto an effective proportion of a stabilizer.

Another object is to provide such dispersions that are suitable for use as, or in the preparation of, coating compositions.

Other objects and advantages of the invention will be evident in the following description.

The objects of this invention have been attained in aqueous colloidal dispersions comprising film-forming organic polymers, solid pigments including reactive zinc oxide pigments, and a novel stabilizing agent for such aqueous dispersions, all as hereinafter more particularly described.

It has now been discovered that such film-forming aqueous coating compositions comprising reactive zinc oxide pigments are stabilized by incorporating therein as a novel stabilizing agent a water-soluble alkali salt of a mono-octyl phosphate ester representable by the formula

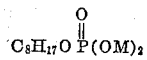

wherein the symbol M represents an alkali cation such as an alkali metal ion, e.g. sodium, potassium or lithium, or ammonium or amine ions.

The improved coating compositions according to this invention comprise a film-forming polymer aqueous dispersion, a pigment composition containing a reactive zinc oxide, and the mono-octyl phosphate stabilizer.

These coating compositions may contain the ingredients, i.e. the pigment, polymer, aqueous medium, and stabilizer, in wide ranges of relative proportions depending upon the intended use. Usually, the compositions useful in coatings contain from about 30 to about 70, preferably from about 40 to about 65 percent by weight of total solids (and correspondingly from about 60 to about 35 percent by weight of aqueous suspending medium) which solids usually contain from about 15 to about 100 parts by weight of polymer solids per 100 parts by weight of pigment solids, although more or less than these proportions can be employed. In the improved compositions of this invention, such compositions also contain a stabilizing proportion of the water-soluble alkali salt of mono-octyl phosphate, usually from 5 to 25 parts by weight of the mono-octyl phosphate stabilizer per 100 parts by weight of the polymer solid constituent of the dispersion.

Film-forming aqueous dispersions of polymers which, upon drying as a thin layer, bind the pigment particles to each other and to a supporting solid surface are already known and are contemplated in the present invention. Reference can be made to the prior art for the kinds of polymer and copolymer compositions and for methods of making aqueous dispersions of such compositions that are suitable for making pigmented coatings compositions. Among the aqueous dispersions or latexes of rubber-like or non-rubber-like resinous plastic polymer materials that have already been described as suitable for making pigmented coatings compositions are film-forming latexes of the following kinds of polymers and copolymers:

Polymers of vinyl and vinylidene compounds, e.g. of conjugated aliphatic dienes such as 1,3-butadiene (herein otherwise referred to simply as "butadiene"), isoprene, 2,3-dimethyl-1,3-butadiene, piperylene, chloroprene, and 2,3-dichloro-1,3-butadiene; alpha-olefins such as ethylene, propylene, butene, isobutene; vinyl esters such as vinyl chloride and vinyl acetate; vinyl ethers; vinyl ketones; vinylidene chloride; vinylidene cyanide; acrylates such as acrylic and methacrylic acids, esters, nitriles, amides, and aldehydes; and styrene compounds such as styrene, vinyltoluene, α-methylstyrene, isopropenyltoluene, divinylbenzene, ar-chlorostyrene, ar-dichlorostyrene, ar-methoxystyrene, vinylnaphthalene, vinylcarbazole, and vinyl pyridine; and drying-oil-modified polymers;

Copolymers of two or more of the above, especially copolymers of one or more of the conjugated dienes and one or more of the monovinyl- or mono-vinylidene compounds copolymerizable therewith, such as copolymers of butadiene and styrene, butadiene and acrylonitrile, isoprene and isobutylene; also copolymers of two or more mono-vinylidene compounds, e.g. vinyl chloride and vinyl acetate, vinyl chloride and vinylidene chloride, and acrylonitrile and isobutylene; and Plasticized homopolymers and plasticized resinous copolymers of kinds that are not usually film-forming except when so plasticized, such as plasticized polystyrene latex and plasticized polymeric vinyltoluene latex.

Mixtures of polymer latexes can also be used, e.g. a mixture of a butadiene-styrene copolymer latex and a butadiene-acrylonitrile latex, or a mixture of a butadiene-styrene latex and a plasticized polystyrene latex.

Film-forming polymer dispersions for aqueous latex paints are usually prepared by emulsion polymerization in well-known ways. For the present purposes, it is desirable that the paint latex be non-acidic, i.e. neutral or alkaline, and that the emulsifiers present therein be principally anionic or non-ionic emulsifiers. If cationic emulsifiers are present, it is desirable that sufficient non-ionic emulsifier also be present so that the latex is not appreciably unstable relative to metal ions.

Specific examples of film-forming polymer aqueous dispersions that are suitable for the present purposes are found in U.S. Patent 2,498,712 by Laurence L. Ryden, which describes water-emulsion paints formulated from film-forming aqueous dispersions of copolymers of mixtures of polymerizable unsaturated organic compounds, including a monovinylaromatic hydrocarbon and an aliphatic conjugated diolefin. The preferred copolymers are described as containing from 40 to 60 mole percent of an aliphatic conjugated diolefin such as 1,3-butadiene or isoprene, and at least 15 mole percent of a monovinyl-aromatic hydrocarbon such as styrene, vinyltoluene, and ar-ethylstyrene, including multi-polymers containing, in addition to the aliphatic conjugated diolefin and mono-vinyl-aromatic hydrocarbon, another copolymerizable vinylidene compound such as methyl methacrylate, vinyl chloride, or vinylidene chloride. The patent also shows a method of making such copolymer aqueous dispersions, and describes making water-base paints from such dispersions.

Further examples of film-forming ternary copolymer aqueous dispersions are disclosed in U.S. Patent 2,476,967 by E. L. Fiedler, including copolymers of from 15 to 50 percent by weight of a monovinyl aromatic compound (such as styrene, ar-methylstyrene, ar-ethylstyrene, ar-isopropylstyrene, or vinylnaphthalene), from 35 to 60 percent of a conjugated diolefin (such as 1,3-butadiene, isoprene, or 2,3-dimethyl-1,3-butadiene), and up to 25 percent of a vinylidene halide (such as vinylidene chloride). Film-forming aqueous dispersions comprising drying-oil fatty acid esters and copolymers of from 25 to 66 mole percent of diolefin are described in U.S. 2,492,124 by A. E. Young and E. K. Stilbert, who also describe paper-coating compositions in U.S. Patent 2,537,114.

A definitive and simple test of suitability of an aqueous film-forming polymer dispersion for use in making the improved coatings compositions of this invention can be carried out as follows. To a sample of a neutral or alkaline aqueous polymer dispersion to be tested, containing at least 5 and not more than 65, preferably from 25 to 55, percent by weight of polymer, is added one or more of the solid pigments such as lithopone or titanium dioxide that are conventionally employed to make water-base paints but not including zinc oxide or calcium sulfate-containing pigments, usually in amount such that the resulting composition contains not more than about 70 percent by weight total solid material, in which there is from 15 to 100 parts by weight of polymer solids per 100 parts by weight of pigment solids. The resulting pigmented polymer aqueous dispersion is then spread as a thin layer on a solid supporting surface such as a surface of primed metal and allowed to dry. Aqueous polymer dispersions suitable for the present purposes are deemed to be ones that in the foregoing test (1) are compatible with usual water-base paint pigments (excluding zinc oxide and calcium sulfate-containing pigments), i.e. that do not coagulate or thicken when admixed with such pigments, and (2) form a substantially continuous, coherent and adherent film when the pigmented compositions are dried as a thin layer on a solid supporting surface.

While the improved coating compositions of this invention can be made from any film-forming polymer aqueous dispersions that pass the foregoing test, the present invention is advantageously employed with those polymer aqueous dispersions that are not compatible with reactive zinc oxide pigments, i.e. that thicken or coagulate when admixed with pigments that supply an appreciable concentration of zinc ions to the aqueous medium of the dispersion. Stable coating compositions can be obtained from such film-forming polymer aqueous dispersions and such reactive zinc oxide pigments by incorporating in the composition a water-soluble alkali salt of a monooctyl phosphate ester as hereinbefore described.

Accordingly, the improved coating compositions of this invention comprise a film-forming polymer aqueous dispersion, the mono-octyl phosphate stabilizer, and a pigment composition. The invention is especially advantageous in the preparation of stable compositions from reactive pigments such as ordinary zinc oxide pigments. In addition to the reactive zinc oxide, the pigment composition can comprise other finely divided solid pigments, pigment extenders, fillers or the like that are conventionally used in compounding water-base paints, such as lithopone, titanium oxide, zinc sulfide, iron oxides, mica, china clay, mineral silicates, and coloriferous agents. Pigment formulations that are adapted for various coatings purposes, such as for exterior paints, are already well known in the art. The pigment composition is usually prepared as an aqueous paste by mixing the solid pigment ingredients with water before adding the polymer dispersion. The pigment paste may contain a small amount, e.g. 0.5 percent by weight of the pigment, of a pigment dispersing or deflocculating agent such as tetrasodium pyrophosphate or potassium tripolyphosphate, and/or up to about 3 percent of the weight of the pigment of a water-dispersible protective colloid such as a partially hydrolyzed polymer of vinyl acetate, a water-soluble cellulosic ether (methyl cellulose), proteinaceous materials (casein), and alginates, but these are not required and may be omitted.

In order that these pigmented film-forming polymer aqueous dispersions that contain reactive zinc oxide pigments be stable, i.e. remain smoothly dispersed, without appreciable thickening or coagulation, during storage after compounding and before use, it is advantageous to incorporate in such dispersions the mono-octyl phosphate stabilizer of the kind hereinbefore described, usually in proportions corresponding to from about 5 to about 25 parts by weight per 100 parts of the polymer solid material in the dispersion. Within the range just stated, the optimum amount of stabilizer that is employed is usually greater in compositions that comprise larger portions of zinc oxide pigment and in compositions that comprise polymer dispersions that are particularly susceptible to thickening or coagulation by such reactive pigments. In some instances where the reactive pigment-containing film-forming polymer aqueous coating composition is to be used up soon after its formulation, the composition can be satisfactorily stabilized by incorporating a smaller proportion, e.g. one percent or less by weight of the polymer, of the stabilizer than would be necessary to maintain stability in the composition for a longer period of time such as is encountered in ready-mixed latex paints that may stand on dealers' shelves for many months before use.

The mono-octyl phosphate stabilizer can be incorporated in the composition at any stage of its preparation. Since pigmented latex coating compositions are usually prepared by admixing a pigment aqueous paste mixture with a polymer aqueous dispersion, the stabilizer is preferably added to at least one of these aqueous dispersions, i.e. to either or to both the pigment aqueous dispersion and the polymer aqueous dispersion, and the resulting dispersions are admixed together. If desired, the stabilizer can be added to the pigmented coating composition after admixing all of the other ingredients, provided that the stabilizer is added to such a composition before an objectionable degree of thickening thereof has taken place. The mono-octyl phosphate stabilizer of this invention is effective in delaying or preventing thickening of compositions of polymer dispersions comprising reactive zinc oxide pigments, but the stabilizer is not effective in redispersing already-coagulated compositions.

The following examples illustrate the invention, but should not be construed as limiting its scope. In the examples, parts and percentages are by weight.

EXAMPLE 1

Several batches of a latex paint were prepared by admixing the following ingredients in proportions as shown:

| | Parts |
|---|---|
| Zinc oxide, American Process common pigment grade | 40 |
| Titanium oxide, rutile type, common pigment grade | 40 |
| Mica, 325 mesh, water-ground | 20 |
| Water-soluble methyl ethers of cellulose, 100 c.p.s., aqueous 4 percent solution | 35 |
| Sodium pentachlorophenate, aqueous 10 percent solution | 4 |
| Tributyl phosphate | 1 |
| Pine oil | 0.36 |
| Water | 55.64 |
| Di-sodium 2-octyl phosphate | As shown |
| Polymer dispersion | 71 |

The polymer dispersion employed in the paint just described was an alkaline aqueous colloidal dispersion containing approximately 48 percent by weight of a copolymer of 60 percent by weight styrene and 40 percent by weight 1,3-butadiene.

The di-sodium 2-octyl phosphate was added in the form of a 50 percent by weight aqueous solution in amount corresponding to the parts by weight of the di-sodium 2-octyl phosphate per 100 parts by weight of polymer as shown in the table. One sample of latex paint was prepared without any added di-sodium 2-octyl phosphate to serve as a blank or control test, and that control sample coagulated immediately upon mixing and became unsuited for use as a paint.

The samples of latex paint containing reactive zinc oxide pigment and various proportions of the di-sodium 2-octyl phosphate stabilizer were placed in closed containers and allowed to stand at room temperature. From time to time, the compositions were examined. In the table, the condition of the compositions at the several times of examination is indicated as "OK," signifying that the composition was smoothly dispersed and suitable for use as a paint, or as "Coagulated," signifying that the composition had thickened or coagulated to a degree rendering the composition unsuited for use as a paint.

Table

| Stabilizer [1] | Condition of Latex Paint | | | | |
|---|---|---|---|---|---|
| | As made | 3 Months | 1 Year | 2 Years | 3 Years |
| 0 | coagulated | | | | |
| 2.9 | OK | coagulated | | | |
| 5.9 | OK | OK | coagulated | | |
| 8.8 | OK | OK | OK | OK | coagulated |
| 11.8 | OK | OK | OK | OK | OK |
| 17.6 | OK | OK | OK | OK | OK |
| 23.5 | OK | OK | OK | OK | OK |

[1] Parts by weight of di-sodium 2-octyl phosphate per 100 parts by weight of polymer in the latex.

In place of the specific pigment composition employed in the foregoing illustration, other pigment formulations comprising reactive zinc oxide can be used. In place of the film-forming styrene-butadiene copolymer aqueous dispersion there can be employed another film-forming resinous or elastomeric polymer aqueous dispersion as hereinbefore described. In place of the di-sodium 2-octyl phosphate stabilizer there can be employed other water-soluble alkali salts of mono-octyl phosphate esters within the scope as hereinbefore defined.

We claim:

1. A film-forming, non-acidic, aqueous coating composition comprising zinc oxide, a film-forming polymer aqueous dispersion that is normally disposed to thicken when mixed with such zinc oxide, the polymer being an addition polymer of an ethylenically unsaturated monomer, and a water-soluble alkali salt of a mono-octyl phosphate ester, there being from 5 to 25 parts by weight of the alkali salt of the mono-octyl phosphate ester per 100 parts by weight of the polymer, from 15 to 100 parts by weight of the polymer per 100 parts by weight of the pigment, and from 30 to 70 percent by weight of total solid material in the composition.

2. A composition according to claim 1 wherein the polymer is a film-forming aliphatic conjugated diene polymer.

3. A composition according to claim 1 wherein the polymer is a film-forming monovinylaromatic compound polymer.

4. A composition according to claim 1 wherein the polymer is a film-forming copolymer of styrene and 1,3-butadiene.

5. A film-forming, non-acidic, aqueous coating composition comprising zinc oxide, a film-forming polymer dispersion that is normally disposed to thicken when mixed with such zinc oxide, which polymer is a copolymer of from 40 to 60 mole percent of an aliphatic conjugaged diolefin and at least 15 mole percent of a monovinyl-aromatic hydrocarbon, and a water soluble di-alkali metal salt of 2-octyl phosphate, there being from 5 to 25 parts by weight of the di-alkali metal salt of 2-octyl phosphate per 100 parts by weight of the polymer, from 15 to 100 parts by weight of the polymer per 100 parts by weight of the pigment, and from 30 to 70 percent by weight of total solid material in the composition.

6. A composition according to claim 5 wherein the polymer is a copolymer of from 40 to 60 mole percent of 1,3-butadiene and correspondingly from 60 to 40 mole percent of styrene.

7. In a method of making an aqueous coating composition wherein zinc oxide is incorporated in a non-acidic film-forming polymer dispersion that normally thickens and becomes unsuited for use as a coating composition when admixed with such zinc oxide, the polymer being an addition polymer of an ethylenically unsaturated monomer, the improvement that comprises incorporating in the coating composition from 5 to 25 parts by weight of a water-soluble alkali salt of a monooctyl phosphate ester per 100 parts of the polymer in the dispersion.

8. A method of making a stable latex paint that contains zinc oxide, which method comprises mixing a pigment comprising zinc oxide, a paint-forming latex comprising a non-acidic, aqueous, film forming polymer dispersion that is normally disposed to coagulate when mixed with zinc oxide, the polymer being an addition polymer of an ethylenically unsaturated monomer, and a water-soluble alkali salt of a mono-octyl phosphate ester as stabilizer for such paint, the starting materials being mixed in proportions corresponding to from 5 to 25 parts by weight of the alkali salt of mono-octyl phosphate ester per 100 parts by weight of the polymer, from 15 to 100 parts by weight of the polymer per 100 parts by weight of the pigment, and from 30 to 70 percent by weight of total solid material in the paint composition.

9. A method according to claim 8 wherein the polymer is a copolymer of from 40 to 60 mole percent of styrene and from 60 to 40 mole percent of 1,3-butadiene.

References Cited in the file of this patent

UNITED STATES PATENTS 2,394,542  Gans ------------------ Feb. 12, 1946

FOREIGN PATENTS 500,014  Canada ---------------- Feb. 16, 1954

OTHER REFERENCES

McGill et al.: "Paint, Oil and Chemical Review," page 102, December 4, 1952.